(12) United States Patent
Kwak et al.

(10) Patent No.: US 9,886,650 B2
(45) Date of Patent: Feb. 6, 2018

(54) METHOD AND DEVICE FOR DETERMINING SIMILARITY BETWEEN SEQUENCES

(71) Applicants: SAMSUNG ELECTRONICS CO., LTD., Suwon-si (KR); Korea University Research and Business Foundation, Seoul (KR)

(72) Inventors: Young-jin Kwak, Yongin-si (KR); Kyung-rae Kim, Seoul (KR); Chang-su Kim, Seoul (KR); Won-dong Jang, Seoul (KR); Jun-tae Lee, Seoul (KR)

(73) Assignees: SAMSUNG ELECTRONICS CO., LTD., Suwon-si (KR); Korea University Research and Business Foundation, Seoul (KR)

( * ) Notice: Subject to any disclaimer, the term of this patent is extended or adjusted under 35 U.S.C. 154(b) by 0 days.

(21) Appl. No.: 15/016,492

(22) Filed: Feb. 5, 2016

(65) Prior Publication Data

US 2016/0267353 A1 Sep. 15, 2016

(30) Foreign Application Priority Data

Mar. 10, 2015 (KR) ........................ 10-2015-0033246

(51) Int. Cl.
*G06K 9/62* (2006.01)
*G06K 9/00* (2006.01)
*G06K 9/46* (2006.01)

(52) U.S. Cl.
CPC ....... *G06K 9/6215* (2013.01); *G06K 9/00744* (2013.01); *G06K 9/00758* (2013.01); *G06K 9/4642* (2013.01); *G06K 9/4652* (2013.01)

(58) Field of Classification Search
CPC ............. G06K 9/6215; G06K 9/00744; G06K 9/00758; G06K 9/4642; G06K 9/00751
See application file for complete search history.

(56) References Cited

U.S. PATENT DOCUMENTS 8,015,159 B2    9/2011  Boicey et al.

FOREIGN PATENT DOCUMENTS

WO    WO 02065782 A1 *    8/2002    ....... G06F 17/30787

\* cited by examiner

*Primary Examiner* — Brian P Werner
(74) *Attorney, Agent, or Firm* — Sughrue Mion, PLLC

(57) ABSTRACT

A method and a device for determining similarity between sequences are provided. The method includes obtaining a first sequence of frames and a second sequence of frames, determining a descriptor of a first frame of the first sequence based on luma information of blocks in the first frame, the descriptor of the first frame including luma difference information that is determined based on the luma information of the blocks in the first frame, determining a descriptor of a second frame of the second sequence based on luma information of blocks in the second frame, the descriptor of the second frame including luma difference information that is determined based on the luma information of the blocks in the second frame, and determining a similarity between the first sequence and the second sequence based on the descriptor of the first frame and the descriptor of the second frame.

18 Claims, 20 Drawing Sheets

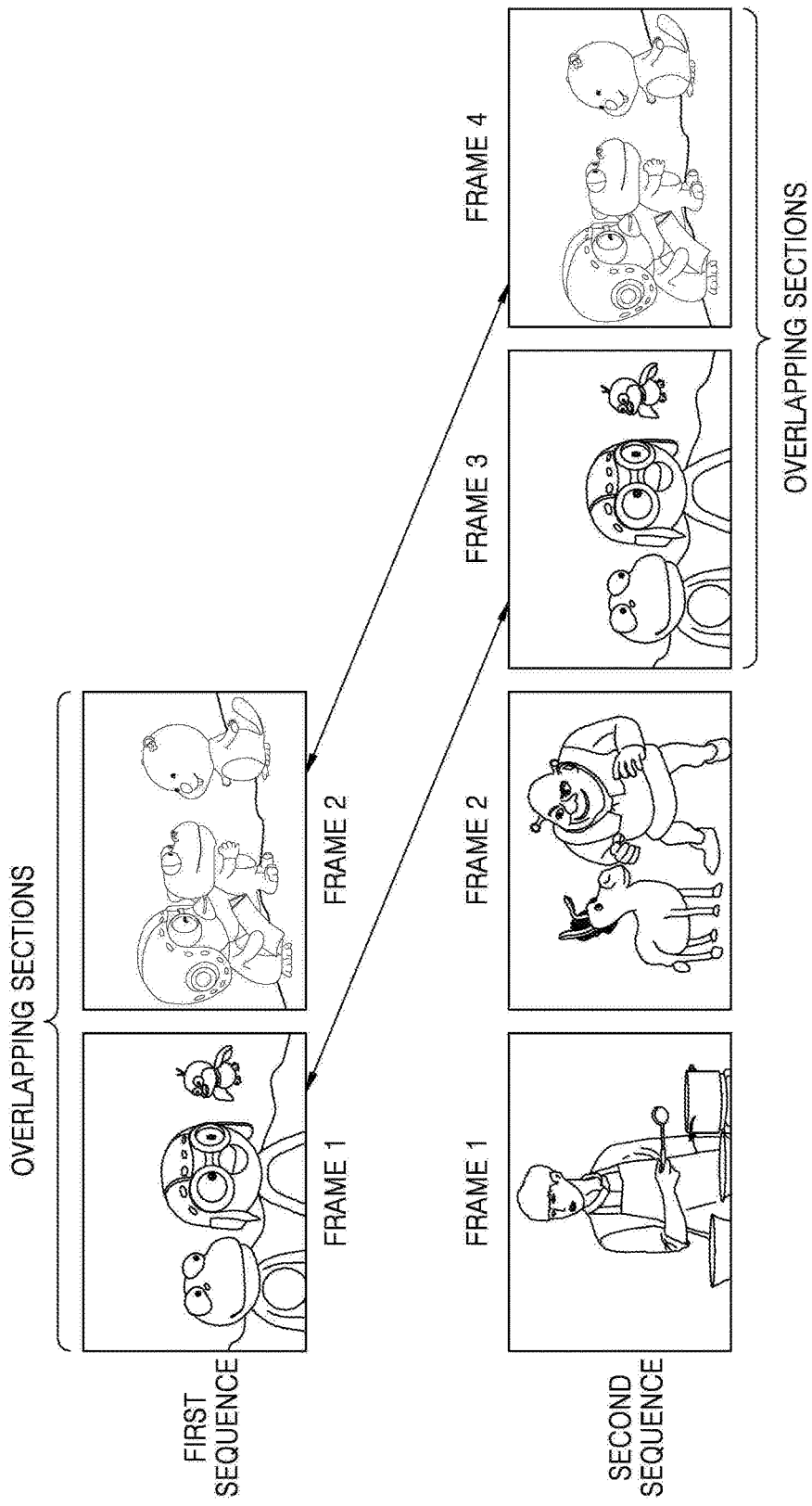

FIRST FRAME

| 401 | 402 | | |
|---|---|---|---|
| 130 | 81 | 98 | 46 |
| 125 | 97 | 121 | 35 |
| 121 | 107 | 139 | 111 |
| 146 | 133 | 150 | 164 |

LUMA INFORMATION

LUMA DIFFERENCE INFORMATION

DESCRIPTOR

ORIGINAL FRAME

FRAME FROM WHICH INITIAL BORDER IS REMOVED

FRAME FROM WHICH CALIBRATED BORDER IS REMOVED

FIRST FRAME

GENERATE HISTOGRAM FOR
INTENSITY INFORMATION

DESCRIPTOR OF
FIRST FRAME

FIRST FRAME

GENERATE HISTOGRAM FOR
INFORMATION ABOUT
REPRESENTATIVE COLOR

DESCRIPTOR OF
FIRST FRAME

METHOD AND DEVICE FOR DETERMINING SIMILARITY BETWEEN SEQUENCES

CROSS-REFERENCE TO RELATED APPLICATION

This application claims priority from Korean Patent Application No. 10-2015-0033246, filed on Mar. 10, 2015, in the Korean Intellectual Property Office, the disclosure of which is incorporated by reference herein in its entirety.

BACKGROUND

1. Field

Methods and apparatuses consistent with exemplary embodiments relate to determining a similarity between sequences in an image.

2. Description of the Related Art

As portable devices become popular and video sharing sites become more actively used, sharing of images by users has increased. Users may share images, which may be copied, edited, and thus, reproduced, with each other, and each reproduced image becomes an image that is similar, but not identical to, an original image. The similar image may include an image having a resolution that is different from that of the original image, an image to which a border is added due to a size difference from that of the original image, an image obtained by performing image processing such as an increase in a contrast ratio of the original image, an image to which a subtitle or a logo is added, or an image whose number of total frames including same frames are different from that of the original image. If the number of similar images is increased, it may be difficult to determine a similarity between an original image and a similar image, and an unnecessary search result may be provided to a user.

SUMMARY

Exemplary embodiments may address at least the above problems and/or disadvantages and other disadvantages not described above. Also, the exemplary embodiments are not required to overcome the disadvantages described above, and may not overcome any of the problems described above.

One or more exemplary embodiments provide a method and a device for determining a similarity between sequences in an image.

According to an aspect of an exemplary embodiment, there is provided a method of determining similarity between sequences, the method including obtaining a first sequence of frames and a second sequence of frames, determining a descriptor of a first frame of the first sequence based on luma information of blocks in the first frame, the descriptor of the first frame including luma difference information that is determined based on the luma information of the blocks in the first frame, determining a descriptor of a second frame of the second sequence based on luma information of blocks in the second frame, the descriptor of the second frame including luma difference information that is determined based on the luma information of the blocks in the second frame, and determining a similarity between the first sequence and the second sequence based on the descriptor of the first frame and the descriptor of the second frame.

The determining the similarity may include matching the first frame with the second frame based on the descriptor of the first frame and the descriptor of the second frame, and determining a section in the second sequence that matches a section in the first sequence as a section similar to the section in the first sequence, based on the matched first frame and second frame.

The matching may include determining whether a Hamming distance between the descriptor of the first frame and the descriptor of the second frame is shortest, and matching the first frame with the second frame in response to the determining that the Hamming distance between the descriptor of the first frame and the descriptor of the second frame is shortest.

The determining the section in the second sequence may include obtaining a matching vector representing a matching relation between the matched first frame and second frame, determining a representative matching vector based on the obtained matching vector, and determining the section in the second sequence that matches the section in the first sequence as the section similar to the section in the first sequence, based on the representative matching vector.

The method may further include determining whether the matching vector of the first frame is not included in a range based on the representative matching vector, and re-matching the first frame with a frame in the second sequence within the range based on the representative matching vector, in response to the determining that the matching vector of the first frame is not included in the range based on the representative matching vector.

The method may further include extracting one or more first frames from the frames of the first sequence based on a frame rate, the first frame being one of the one or more first frames, and extracting one or more second frames from the frames of the second sequence based on the frame rate, the second frame being one of the one or more second frames.

The determining the descriptor of the first frame or the second frame may include determining whether a number of pixels having a same pixel value at a same location in the frames of the first sequence or the second sequence, and in a row or a column of the first frame or the second frame, is greater than or equal to a number, and determining the descriptor based on the luma information of the blocks in the first frame or the second frame other than the row or the column of the first frame or the second frame, in response to the determining that the number of pixels having the same pixel value at the same location in the frames of the first sequence or the second sequence, and in the row or the column of the first frame or the second frame, is greater than or equal to the number.

The method may further include determining a descriptor of the first sequence based on the descriptor of the first frame, and determining a descriptor of the second sequence based on the descriptor of the second frame, and the determining the similarity may include determining the similarity based on a comparison of the descriptor of the first sequence to the descriptor of the second sequence.

The determining the descriptor of the first sequence may include converting the descriptor of the first frame into the descriptor of the first sequence based on codes, and the determining the descriptor of the second sequence may include converting the descriptor of the second frame into the descriptor of the second sequence based on the codes.

A non-transitory computer-readable recording storage medium may store a program to cause a computer to perform the method.

According to an aspect of another exemplary embodiment, there is provided a device for determining similarity between sequences, the device including a sequence obtainer configured to obtain a first sequence of frames and a second sequence of frames, and a descriptor determiner configured to determine a descriptor of a first frame of the first sequence based on luma information of blocks in the first frame, the descriptor of the first frame including luma difference information that is determined based on the luma information of the blocks in the first frame, and determine a descriptor of a second frame of the second sequence based on luma information of blocks in the second frame, the descriptor of the second frame including luma difference information that is determined based on the luma information of the blocks in the second frame. The device further includes a similarity determiner configured to determine a similarity between the first sequence and the second sequence based on the descriptor of the first frame and the descriptor of the second frame.

The similarity determiner may be further configured to match the first frame with the second frame based on the descriptor of the first frame and the descriptor of the second frame, and determine a section in the second sequence that matches a section in the first sequence as a section similar to the section in the first sequence, based on the matched first frame and second frame.

The similarity determiner may be further configured to determine whether a Hamming distance between the descriptor of the first frame and the descriptor of the second frame is shortest, and match the first frame with the second frame in response to the similarity determiner determining that the Hamming distance between the descriptor of the first frame and the descriptor of the second frame is shortest.

The similarity determiner may be further configured to obtain a matching vector representing a matching relation between the matched first frame and second frame, determine a representative matching vector based on the obtained matching vector, and determine the section in the second sequence that matches the section in the first sequence as the section similar to the section in the first sequence, based on the representative matching vector.

The similarity determiner may be further configured to determine whether the matching vector of the first frame is not included in a range based on the representative matching vector, and re-match the first frame with a frame in the second sequence within the range based on the representative matching vector, in response to the similarity determiner determining that the matching vector of the first frame is not included in the range based on the representative matching vector.

The sequence obtainer may be further configured to extract one or more first frames from the frames of the first sequence based on a frame rate the first frame being one of the one or more first frames, and extract one or more second frames from the frames of the second sequence based on the frame rate, the second frame being one of the one or more second frames.

The descriptor determiner may be further configured to determine whether a number of pixels having a same pixel value at a same location in the frames of the first sequence or the second sequence, and in a row or a column of the first frame or the second frame, is greater than or equal to a number, and determine the descriptor based on the luma information of the blocks in the first frame or the second frame other than the row or the column of the first frame or the second frame, in response to the descriptor determiner determining that the number of pixels having the same pixel value at the same location in the frames of the first sequence or the second sequence, and in the row or the column of the first frame or the second frame, is greater than or equal to the number.

The descriptor determiner may be further configured to determine a descriptor of the first sequence based on the descriptor of the first frame, and determine a descriptor of the second sequence based on the descriptor of the second frame, and the similarity determiner may be further configured to determine the similarity based on a comparison of the descriptor of the first sequence to the descriptor of the second sequence.

The descriptor determiner may be further configured to convert the descriptor of the first frame into the descriptor of the first sequence based on codes, and convert the descriptor of the second frame into the descriptor of the second sequence based on the codes.

The descriptor determiner may be further configured to convert the descriptor of the first frame into an index number of a code that is most similar to the descriptor of the first frame, among the codes, and generate a histogram of index numbers based on the index number as the descriptor of the first sequence.

BRIEF DESCRIPTION OF THE DRAWINGS

The above and/or other aspects will be more apparent by describing exemplary embodiments with reference to the accompanying drawings, in which:

FIG. 3 is a diagram illustrating an overlapping section between sequences that is determined by the device, according to an exemplary embodiment;

DETAILED DESCRIPTION

Figure 1:
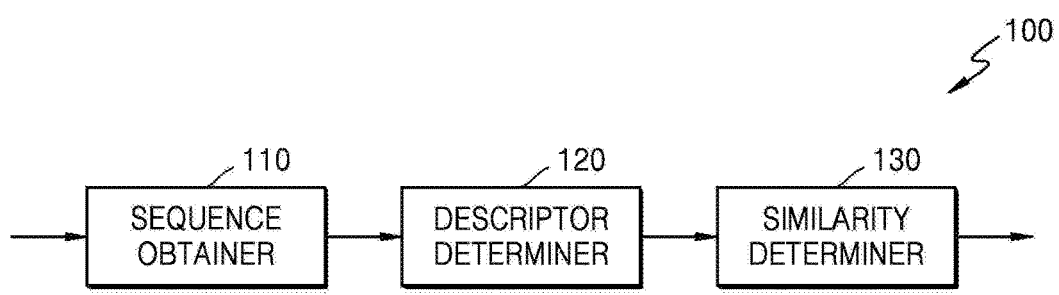
FIG. 1 is a block diagram of a device for determining a similarity between sequences according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms "comprises" and/or "comprising" used herein specify the presence of stated features or components, but do not preclude the presence or addition of one or more other features or components. In addition, the terms such as "unit," "-er (-or)," and "module" described in the specification refer to an element for performing at least one function or operation, and may be implemented in hardware, software, or the combination of hardware and software.

FIG. 1 is a block diagram of a device 100 for determining a similarity between sequences according to an exemplary embodiment.

According to an exemplary embodiment, the device 100 includes a sequence obtainer 110, a descriptor determiner 120, and a similarity determiner 130. Each element of the device 100 will be described after an example of determining a similarity between sequences, which is performed by the device 100, is described with reference to FIGS. 2 and 3.

Figure 2:
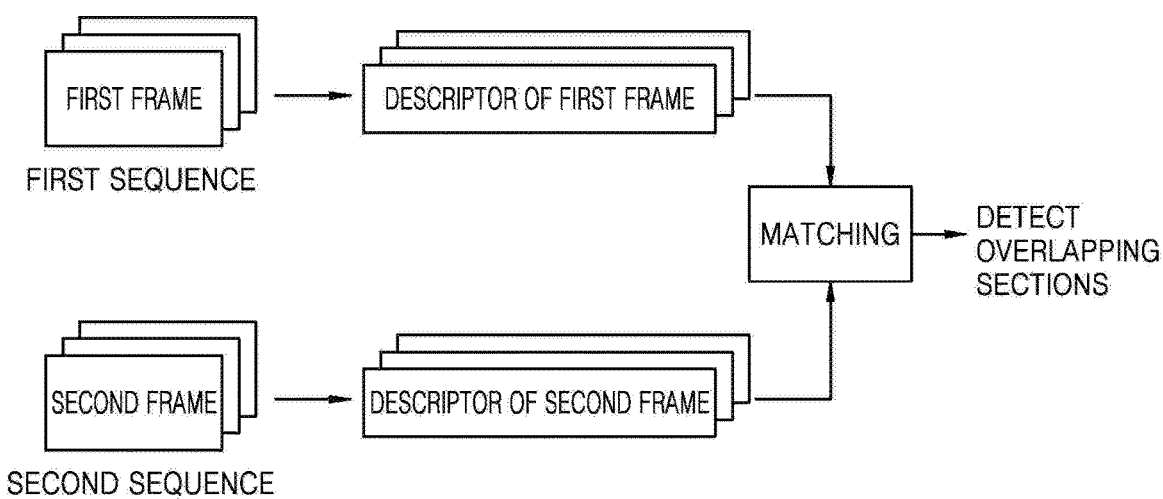
FIG. 2 is a diagram illustrating a process of determining a similarity between sequences, which is performed by the device, according to an exemplary embodiment.

FIG. 2 is a diagram illustrating a process of determining a similarity between sequences, which is performed by the device 100, according to an exemplary embodiment.

According to an exemplary embodiment, the device 100 may compare frames included in a sequence to frames included in another sequence with respect to a plurality of sequences, and thus, determine a similarity between the sequences.

A sequence is a part or whole of an image, and may be a group of consecutive frames that constitute a part or whole of a plurality of frames included in the image. The device 100 may obtain a plurality of sequences from an image or images that are different from each other. For example, the device 100 may obtain a first sequence that includes a first frame and a second sequence that includes a second frame.

The device 100 may determine a descriptor representing color information about a frame, with respect to frames included in the obtained plurality of sequences, and compare frames, included in sequences from each other, to each other by using the determined descriptor. Color information about a frame is information about values of pixels included in the frame, and may be information that includes intensity information, luma (luminance) information, or chroma information for each color channel.

A descriptor may be a descriptor of a frame that represents color information about the frame, or a descriptor of a sequence that represents color information about the sequence. A descriptor of a sequence may be determined by using descriptors of frames included in the sequence.

The device 100 may determine a descriptor with respect to a frame. For example, the device 10 may determine a descriptor of a first frame based on luma information about a plurality of blocks in the first frame included in the first sequence, and determine a descriptor of a second frame based on luma information about a plurality of blocks in the second frame included in the second sequence.

In detail, the device 100 may determine a luma difference between a plurality of blocks based on luma information about the plurality of blocks that constitute a frame, and determine a descriptor of a frame that includes information about the luma difference between the plurality of blocks according to a predetermined order. A detailed process of determining a descriptor will be described with reference to FIGS. 4A through 4D.

The device 100 may determine a similarity between sequences by using the determined descriptors. For example, the device 100 may determine a similarity between the first sequence and the second sequence by using the descriptor of the first frame and the descriptor of the second frame. The device 100 may detect a section in the second sequence that is determined as a section similar to a section in the first sequence, from sections that include one or more frames in the second sequence, by using the descriptor of the first frame and the descriptor of the second frame.

The device 100 may determine or detect whether sequences are similar to each other or determine sections similar to or overlapping each other between the sequences, by matching frames included in sequences different from each other by using the determined descriptors. A method of matching frames with each other will be described in detail with reference to FIGS. 5 through 9.

FIG. 3 is a diagram illustrating an overlapping section between sequences that is determined by the device 100, according to an exemplary embodiment.

Referring to FIG. 3, a first sequence that includes a frame 1 and a frame 2, and a second sequence that includes frames 1 through 4.

The device 100 may determine descriptors of frames included in each sequence, and compare frames included in the first sequence to frames included in the second sequence by using the determined descriptors of each frame.

The device 100 may match one of the frames included in the first sequence with one of the frames included in the second sequence by comparing the frames to each other. The device 100 may determine a section in the second sequence, which matches a section in the first sequence, and thus, is a similar section with respect to the section in the first sequence, based on the matching between the frames.

For example, in FIG. 3, the frame 1 in the first sequence may match the frame 3 in the second sequence, and the frame 2 in the second sequence may match the frame 4 in the second sequence. Accordingly, the device 100 may determine a section that includes the frames 3 and 4 in the second sequence as a section similar to a section that includes the frames 1 and 2 in the first sequence.

The device 100 may improve efficiency in data management, by quickly determining whether sequences are similar to each other or determining similar sections between sequences by using descriptors, and provide information about a similarity between images to a user. Additionally, the device 100 may synchronize sequences with each other, and thus, provide an easy and quick image editing method.

Referring back to FIG. 1, the sequence obtainer 110 is an element for obtaining a plurality of sequences, and may obtain a plurality of sequences from an image stored in the device 100 or an external apparatus. The sequence obtainer 110 may obtain a plurality of sequences from an image or images different from each other. The sequence obtainer 110 may transmit the obtained plurality of sequences to the descriptor determiner 120.

The sequence obtainer 110 may extract one or more frames, from a plurality of frames included in the obtained plurality of sequences, as key frames and determine a similarity between the plurality of frames by using only the key frames obtained by the extracting.

For example, if frames rates of the obtained plurality of sequences are different from each other, a matching relation between the plurality of frames may be complicated. Additionally, in a case of a sequence having a very high frame rate, too many operations may be used to match frames with each other.

Accordingly, the sequence obtainer 110 may extract key frames from the obtained sequences according to a predetermined frame rate, to easily represent a matching relation between frames and effectively increase an operation speed. In detail, the sequence obtainer 110 may extract one or more frames included in the first sequence as one or more key frames in the first sequence according to a predetermined frame rate, and extract one or more frames included in the second sequence as one or more key frames in the second sequence according to the frame rate.

The sequence obtainer 110 may transmit the extracted one or more key frames to the descriptor determiner 120.

The descriptor determiner 120 is an element for determining a descriptor representing color information about a frame or a sequence. The descriptor determiner 120 may determine a descriptor of a frame that represents color information about the frame or a descriptor of a sequence that represents color information about the sequence. The descriptor determiner 120 may determine a descriptor of a sequence by using descriptors of frames included in the sequence.

The descriptor determiner 120 may determine a descriptor of a frame by using color information about pixels included in the frame. For example, the descriptor determiner 120 may determine a descriptor of a first frame based on luma information about pixels included in the first frame, and determine a descriptor of a second frame based on luma information about pixels included in the second frame.

For example, the descriptor determiner 120 may divide the first frame into a plurality of blocks that have a same size and include a plurality of pixels. The descriptor determiner 120 may determine luma information about each block by using luma values of pixels included each block. For example, luma information about a block may be an average luma value of the block.

The descriptor determiner 120 may compare the determined luma information about the respective blocks to each other, and thus, determine information about a luma difference between blocks. The information about the luma difference between blocks may be information obtained by numeralizing a value of a difference between average luma values of the respective blocks according to a predetermined reference section. For example, the information about the luma difference may be information expressing a value of a difference between average luma values of two blocks in a 2-bit binary code. The descriptor determiner 120 may determine a descriptor of the first frame that is expressed in a 2-bit binary code based on information about a luma difference between the determined plurality of blocks.

Additionally, the descriptor determiner 120 may also determine a descriptor of the first frame based on color information or chroma information about pixels included in the first frame.

The descriptor determiner 120 may determine a descriptor of a frame with respect to all frames or key frames in the first sequence and the second sequence received from the sequence obtainer 110.

The descriptor determiner 120 may determine a descriptor of the first sequence based on descriptors of a plurality of frames in the first sequence including the descriptor of the first frame, and determine a descriptor of the second sequence based on descriptors of a plurality of frames in the second sequence including the descriptor of the second frame. A process of determining a descriptor of a sequence will be described in detail with reference to FIGS. 11 through 13.

The descriptor determiner 120 may transmit the descriptor of the first frame and the descriptor of the second frame to the similarity determiner 130. Alternatively, the descriptor determiner 120 may transmit the descriptor of the first sequence and the descriptor of the second sequence to the similarity determiner 130.

The similarity determiner 130 may determine a similarity between sequences by using the descriptors received from the descriptor determiner 120. The similarity determiner 130 may determine a similarity between the first sequence and the second sequence by using the descriptor of the first frame and the descriptor of the second frame that are received from the descriptor determiner 120.

In detail, the similarity determiner 130 may match the first frame with the second frame by using the descriptor of the first frame and the descriptor of the second frame. The matching of frames may include determination of two frames, which are included in sequences different from each other and are determined as being most similar to each other. For example, a first frame in the first sequence may match the second frame in the second sequence.

The similarity determiner 130 may determine frames having a shortest matching distance therebetween as most similar frames, and match the frames with each other. For example, the similarity determiner 130 may determine a matching distance between frames by calculating a Hamming distance between descriptors of the frames.

A Hamming distance is a number of different characters located in a same position in two code strings having a same number of bits. For example, because a third bit and a fourth bit are different between a first code "00011" and a second code "00101," a Hamming distance between the first code and the second code is 2.

Equation 1 for calculating a Hamming distance between an ath frame in a first sequence and a bth frame in a second sequence is as follows:

$$d(a, b) = \sum_i |Ia(i) - Ib(i)|  \quad \text{[Equation 1]}$$

In Equation 1, a may represent an index of a frame included in the first sequence, and b may represent an index of a frame in a second sequence. Ia(i) may represent an ith bit value of a descriptor of the ath frame, and Ib(i) may represent an ith bit value of a descriptor of the bth frame.

The similarity determiner 130 may calculate a Hamming distance between the descriptor of the first frame in the first sequence and descriptors of all frames in the second sequence and match a frame in the second sequence, which has a shortest Hamming distance from the first frame, with the first frame. For example, if a Hamming distance between the descriptor of the first frame and the descriptor of the second frame is shortest, the similarity determiner 130 may match the first frame with the second frame.

The similarity determiner 130 may represent a matching relation between frames, which is obtained by using descriptors, as a matching vector. The matching vector may be a value of a difference between an index of the first frame and an index of the second frame. For example, if the index of the first frame in the first sequence is 1 and the index of the second frame in the first sequence is 5, the matching vector may be expressed as 4(5−1=4).

The similarity determiner 130 may determine a section in the second sequence, which matches a predetermined section in the first sequence as a similar section, by using the determined matching vector. Alternately, the similarity determiner 130 may determine a representative matching vector to speed up the similarity determination. For example, the similarity determiner 130 may determine a vector having a highest frequency, among matching vectors between sequences that are different from each other, as a representative matching vector. Alternately, the similarity determiner 130 may determine a vector having an average value, among the matching vectors between the sequences that are different from each other, as a representative matching vector. However, the determining of a representative matching vector is not limited thereto, and a representative matching vector may be determined by using various methods.

The similarity determiner 130 may determine a matching having a matching vector that is not similar to the representative matching vector, among matchings, as noise, by using the determined representative matching vector, and thus, remove the matching determined as noise. The similarity determiner 130 may perform an additional matching on frames whose matching was removed. In detail, the similarity determiner 130 may perform the additional matching on frames whose matching was removed so that a matching vector of the additional matching is similar to the representative matching vector. For example, the similarity determiner 130 may match the frames with each other within a range according to the representative matching vector.

The similarity determiner 130 may determine a section in the second sequence that matches a section in the first sequence as a similar section, based on matching vectors of the additional matching.

Additionally, the similarity determiner 130 may receive a descriptor of the first sequence and a descriptor of the second sequence from the descriptor determiner 120, and thus, determine whether the first sequence is similar to the second sequence.

FIGS. 4A, 4B, 4C, and 4D are diagrams illustrating a process of determining a descriptor, which is performed by the device 100, according to an exemplary embodiment.

The device 100 may determine a descriptor of a frame by using luma information about frames included in an obtained sequence. For example, a descriptor of a frame may be information about a difference between luma values at locations in the frame. An example of a process of determining a descriptor of a first frame included in a first sequence is described with reference to FIGS. 4A through 4D.

Figures 4A, 4B:
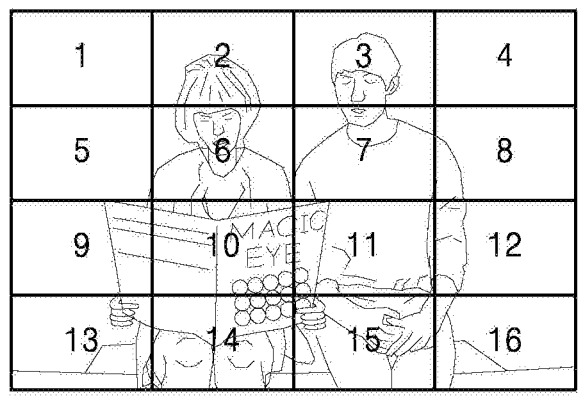
FIGS. 4A, 4B, 4C, and 4D are diagrams illustrating a process of determining a descriptor, which is performed by the device, according to an exemplary embodiment.

Referring to FIG. 4A, the device 100 may divide the first frame into a plurality of blocks that have a same size and include a plurality of pixels. For example, the device may divide the first frame into 16 blocks having a same size. A number shown on a block refers to an index of the block.

Referring to FIG. 4B, the device 100 may determine luma information about each block by using a luma value of pixels included in each block. For example, luma information about a first block 401 may be determined as 130, which is an average luma value of pixels included in the first block 401. Additionally, luma information about a second block 402 may be determined as 81.

Figure 4C:
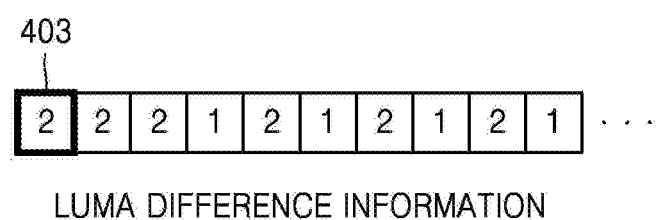
Figure 4D:
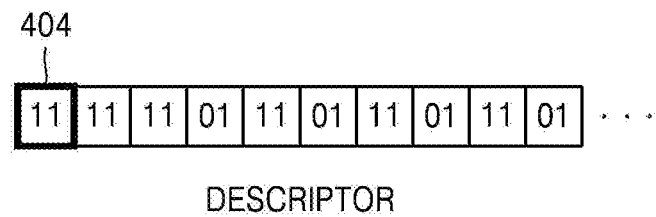

Referring to FIG. 4C, the device 100 may determine information about a luma difference between blocks, by using luma information about the blocks. For example, the device 100 may determine luma difference information 403 by using a value of a difference between an average luma value of the first block 401 and an average luma value of the second block 402. The luma difference information may be information obtained by numeralizing a value of a difference between values of the luma information about blocks according to a predetermined reference section.

In detail, the device 100 may determine luma difference information Pij as shown in Equation 2, according to sizes of luma values included into luma information about two blocks that are to be compared to each other.

$$Pij = \begin{cases} 0, & Li - Lj < -T \\ 1, & |Li - Lj| \leq T \\ 2, & Li - Lj \geq T \end{cases} \qquad [\text{Equation 2}]$$

In Equation 2, Pij represents information about a luma difference between an ith block and a jth block. Li represents luma information about the ith block, and Lj represents luma information about the jth block. T may be a predetermined constant for setting a predetermined reference section. For example, T may be 20.

Because a value of a difference between luma information about the first block 410 and the second block 402 is 49, and thus, greater than 20, the device 100 may determine the luma difference information 403 with respect to the first block 401 and the second block 402 as 2. Additionally, the device 100 may continue to compare the first block 401 to other blocks, and thus, determine information about a luma difference between blocks. The device 100 may arrange the determined information about the luma difference between the blocks according to a predetermined order. In FIG. 4C, if 16 blocks are included in a first frame, the device 100 may determine information about a luma difference with respect to the first frame that includes 120 numbers in total.

The device 100 may convert the determined luma difference information into a binary code, and thus, determine a descriptor of the first frame. For example, luma difference information 0 may be converted into 00, luma difference information 1 may be converted into 01, and luma difference information 2 may be converted into 11 as in a first block 404 of the descriptor. For example, in FIG. 4D, the device 100 may determine a 240-bit binary descriptor with respect to the first frame.

The device 100 may determine a descriptor of a frame by performing a same process on all frames in an obtained sequence. The device 100 may match frames with each other by using the determined descriptors of the frames.

Figure 5:
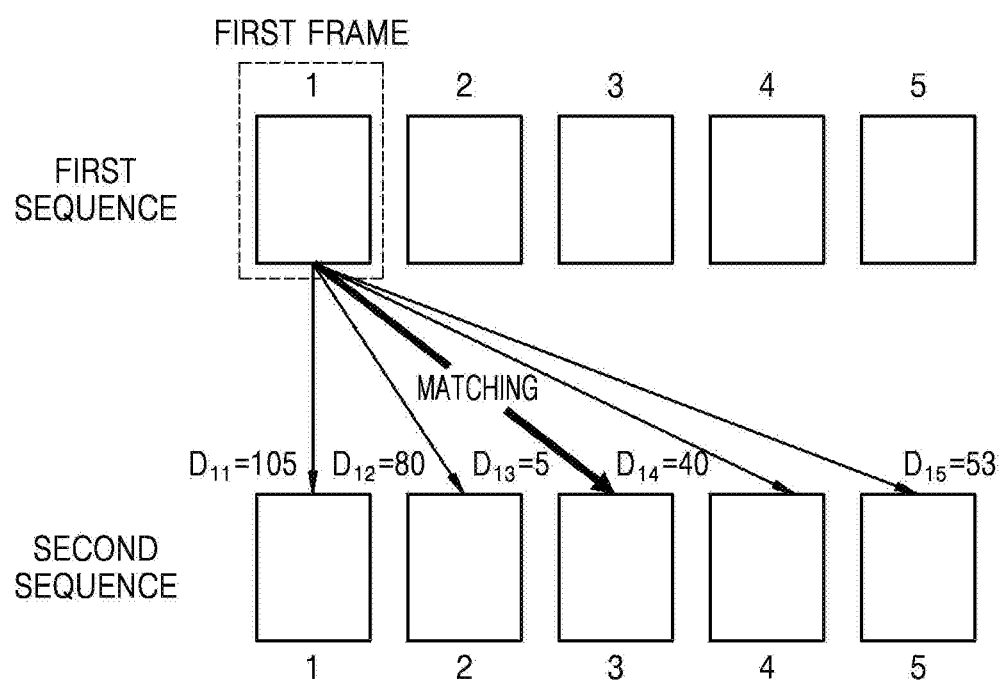
FIG. 5 is a diagram illustrating a process of matching frames with each other, which is performed by the device, according to an exemplary embodiment.

FIG. 5 is a diagram illustrating a process of matching frames with each other, which is performed by the device 100, according to an exemplary embodiment.

The device 100 may match frames by using the determined descriptors, to determine a similarity between sequences. For example, the device 100 may match the first frame in the first sequence with a frame that is most similar to the first frame among frames included in the second sequence. FIG. 5 shows a process of matching five frames included in the first sequence with five frames included in the second sequence.

The device 100 may use a descriptor of a frame to determine a frame that is most similar to the first frame.

In detail, the device 100 may determine a matching distance "Dab" between a first frame in the first sequence and all frames in the second sequence, and thus, determine frames, whose matching distance from the first frame is shortest, as similar frames. a may represent an index of a frame in the first sequence, and b may represent an index of a frame in the second sequence. The device 100 may calculate a Hamming distance between descriptors of frames, and thus, determine a matching distance between the frames.

Referring to FIG. 5, the device 100 may calculate a matching distance between the first frame that is a frame 1 in the first sequence and a frame 1 in the second sequence as D11=105. Additionally, the device 100 may calculate matching distances between the first frame in the first sequence and frames 1 through 5 in the second sequence respectively as D12=80, D13=5, D14=40, and D15=53. The device 100 may match the first frame that is the frame 1 in the first sequence with the frame 3 in the second sequence that has a shortest matching distance D13=5 from the frame 1 in the first sequence.

The device 100 may match all frames in the first sequence respectively with a frame among frames in the second sequence by performing the same process.

FIGS. 6, 7A, 7B, 8A, and 8B are diagrams illustrating a process of determining a similarity between sequences by matching frames with each other, which is performed by the device 100, according to an exemplary embodiment.

Figure 6:
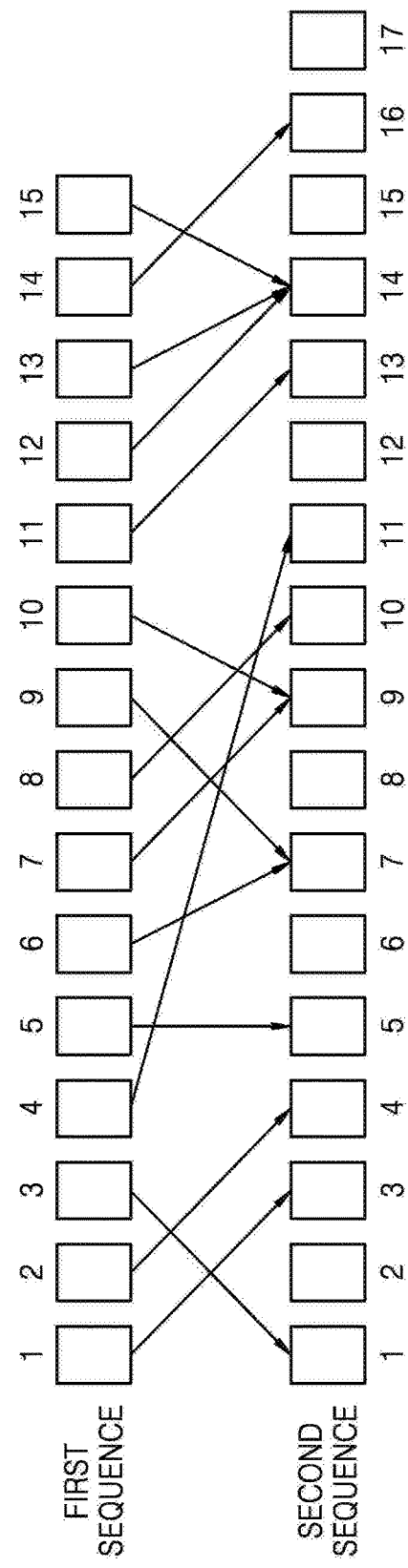
FIGS. 6, 7A, 7B, 8A, 8B, and 9 are diagrams illustrating a process of determining a similarity between sequences by matching frames with each other, which is performed by the device, according to an exemplary embodiment.

FIG. 6 illustrates matching of all frames in a first sequence with frames in a second sequence, according to the process of matching frames with each other that is described with reference to FIG. 5.

Referring to FIG. 6, the first sequence may include 15 frames, and the second sequence may include 17 frames. A frame 1 in the first sequence may match a frame 3 in the second sequence and a frame 2 in the first sequence may match a frame 4 in the second sequence, according to the process of the matching described with reference to FIG. 5.

The device 100 may represent a matching relation between frames as a matching vector. For example, the matching vector may be a value of a difference between an index of a frame in the first sequence and an index of a frame in the second sequence. For example, the device 100 may represent a matching vector between the frame 1 in the first sequence and the frame 3 in the second sequence as 2(3−1=2), and represent a matching vector between the frame 2 in the first sequence and the frame 4 in the second sequence as 2(4−2=2).

Figure 7A:
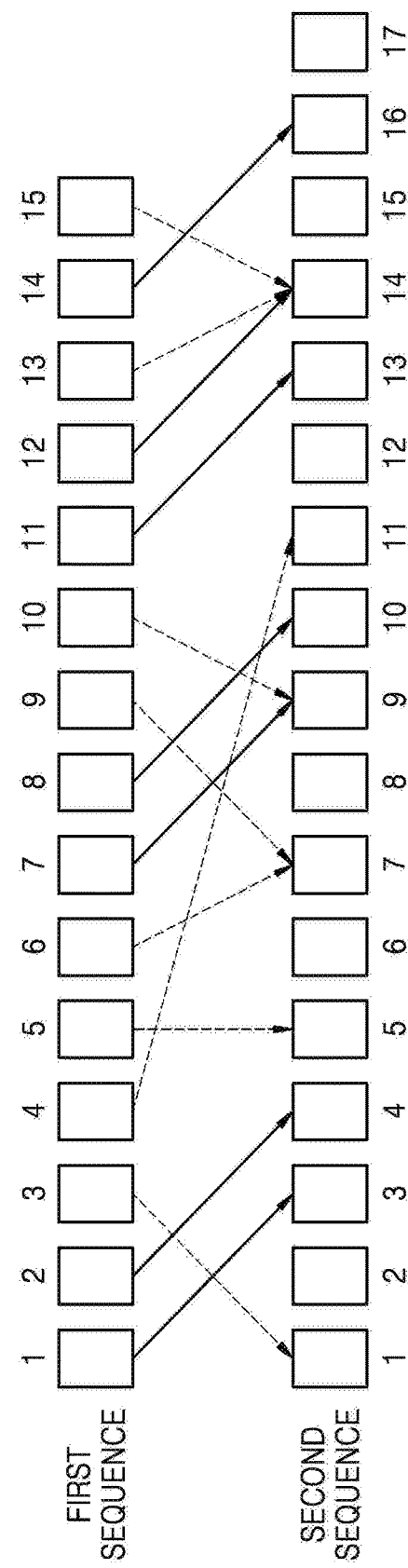

The device 100 may determine a representative matching vector among the determined matching vectors. For example, the device 100 may determine a vector having a highest frequency, among the determined matching vectors, as a representative matching vector. Referring to FIG. 7A, matching vectors determined as a representative matching vector, among the matching vectors determined in the process described with reference to FIG. 6, are shown in a solid line. Other matching vectors than the representative matching vector are shown in a dotted line.

Figure 7B:
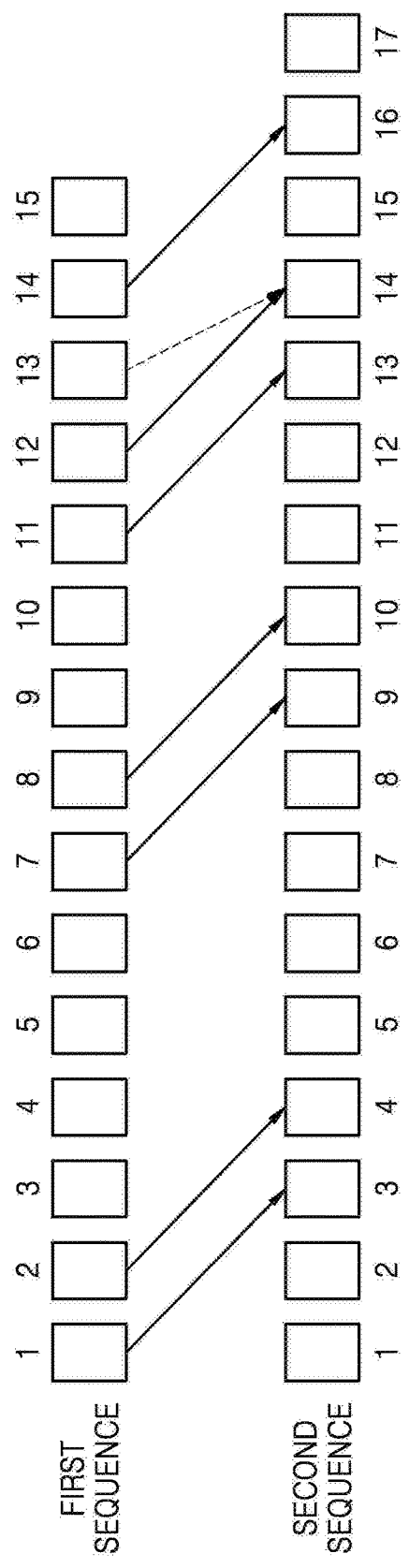

The device 100 may determine matchings having a matching vector that is not similar to the representative matching vector, among matchings between frames, as noise, by using the determined representative matching vector, and thus, remove the matchings. For example, the device 100 may set a range with reference to the representative matching vector, remove matchings having a matching vector that is greater or less than the representative matching vector by 2, and extract only matchings, which have a matching vector that is equal to, or greater or less than the representative matching vector by 1, from the matchings. Referring to FIG. 7B, matching vectors included in a range according to the representative matching vector are shown.

In FIG. 7B, both frames 12 and 13 in the first sequence match a frame 14 in the second sequence. Accordingly, redundant matchings may occur. Additionally, because a matching vector of the frame 12 and a matching vector of the frame 13 in the first sequence are included in a range according to the representative matching vector, the matching vectors thereof are not removed. Accordingly, the device 100 may remove a matching from the redundant matchings. For example, the device 100 may remove a matching having a longer matching distance between frames than another matching from redundant matchings.

The device 100 may perform an additional matching on frames that are not matched as a matching thereof was removed. For example, referring to FIG. 8A, as matchings are removed, frames that are not matched with each other occur. For example, frames 3, 4, 5, 9, 10, 13, and 15 in the first sequence may be frames that are not matched with each other.

The device 100 may extract a non-matching section 810, in which frames that are not matched with each other are consecutively present in the first sequence, from the first sequence, and thus, determine whether to perform an additional matching on the frames in the non-matching section 810.

For example, if a number of frames included in the non-matching section 810 in the first sequence is greater than a predetermined number, the device 100 may determine that a section similar to the non-matching section 810 in the first sequence is not present in the second sequence, and thus, determine that the frames are not to be further performed. Additionally, if a number of the frames included in the non-matching section 810 in the first sequence is not greater than a predetermined number, the device 100 may determine that an additional matching is to be performed, to find a section, which is similar to the non-matching section 810 in the first sequence, in the second sequence.

Figure 8A:
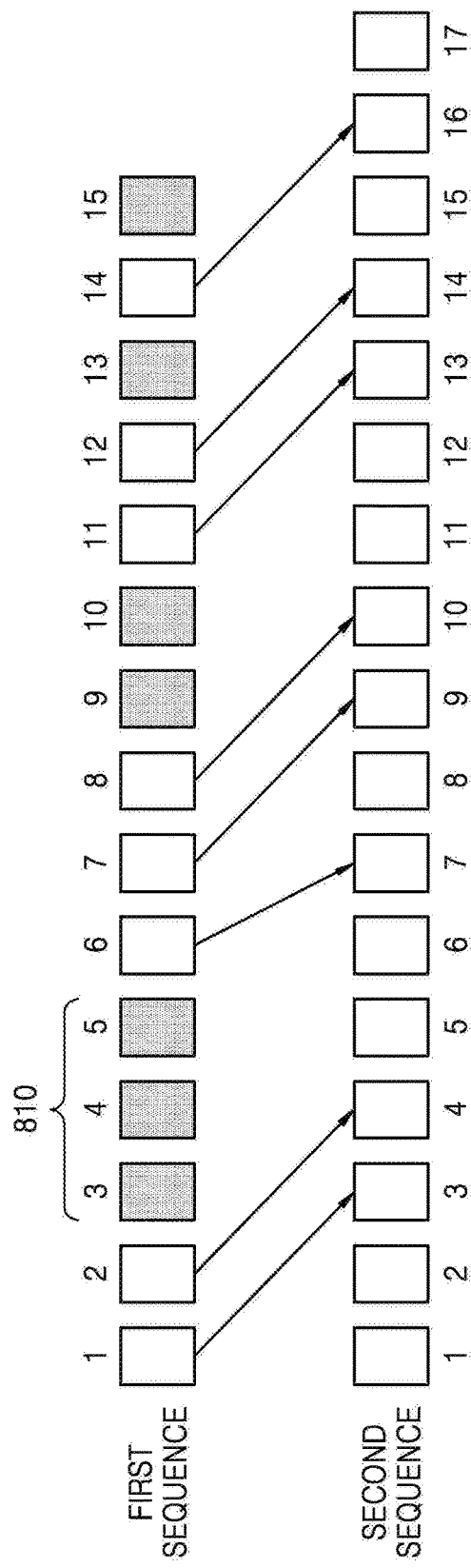
Figure 8B:
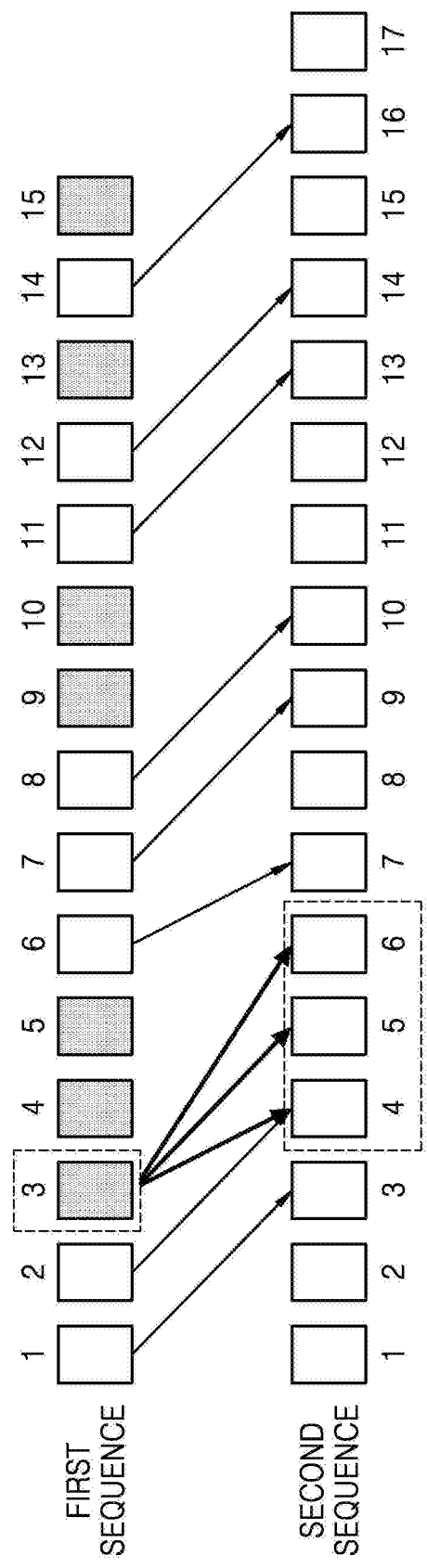

If the device 100 determines that an additional matching is to be performed on the frames, the device 100 may re-match frames in the first sequence, which are not matched with each other, with frames in the second sequence. FIG. 8B shows a process of performing an additional matching on a frame 3 in the first sequence.

The device 100 may compare the frame 3 in the first sequence with frames in a range in the second sequence instead of all frames in the second sequence, to match the frame 3 with frames in the second sequence. For example, the device 100 may set a range with reference to a representative matching vector. The range may be a range that includes a frame 5 in the second sequence that is matched with the frame 3 in the first sequence with reference to the representative matching vector, a frame (a frame 4) that comes right before the frame 5, and a frame (a frame 6) that comes right after the frame 5.

The device 100 may determine a matching distance between the frame 3 in the first sequence and the frames 4 through 6 in the second sequence, and thus, further match a frame in the second sequence, which has a shortest matching distance from the frame 3 in the first sequence, with the frame 3 in the first sequence.

The device 100 may perform an additional matching on the frames 4, 5, 9, 10, and 13 in the first sequence by performing the same process.

Figure 9:
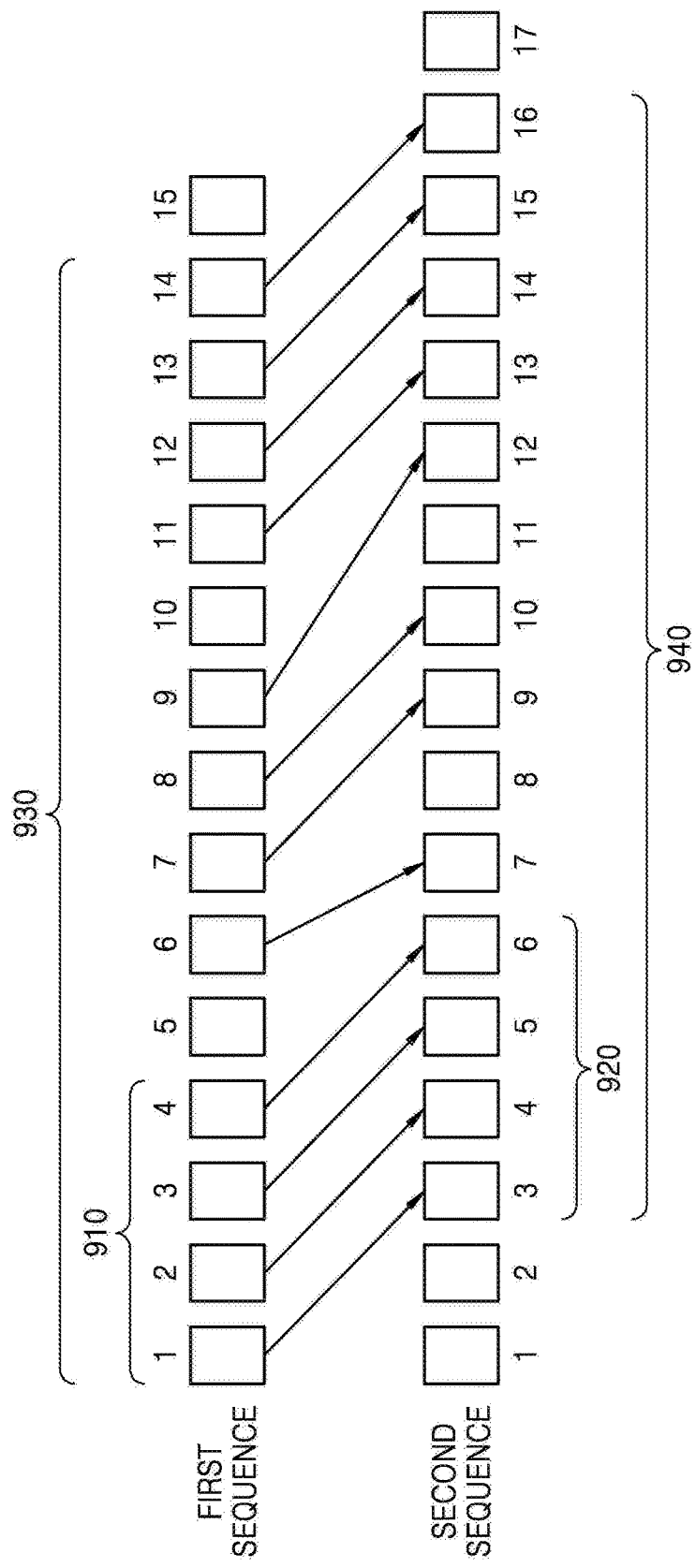

FIG. 9 shows completion of a matching between the first sequence and the second sequence according to a process of performing additional matchings and a process of removing redundant matchings.

With respect to a frame in the first sequence on which an additional matching is performed, even if the additional matching is removed in a process of removing matchings, the device 100 may not perform an additional matching on the frame. Accordingly, even when the matching is completed, frames that are not matched with each other, such as the frames 5, 10, and 15 in the first sequence, may be present.

After the matching is completed, the device 100 may determine a section in the second sequence, which matches a section in the first sequence as a similar section, among sections that include frames in the second sequence. For example, the device 100 may determine a section similar to a first section 910 in the first sequence as a second section 920 in the second sequence. The first section 910 may be a section that includes frames 1 through 4 in the first sequence, and the second section 920 may be a section that includes frames 3 through 6 in the second sequence.

Additionally, the device 100 may determine a section similar to a third section 930 in the first sequence as a fourth section 940 in the second sequence. The third section 930 may be a section that includes frames 1 through 14 in the first sequence, and the fourth section 940 may be a section that includes frames 3 through 16 in the second sequence.

The device 100 may determine a frame in the second sequence corresponding to a frame in the first sequence and determine similar sections between sequences, by using a matching between frames.

Figure 10A:
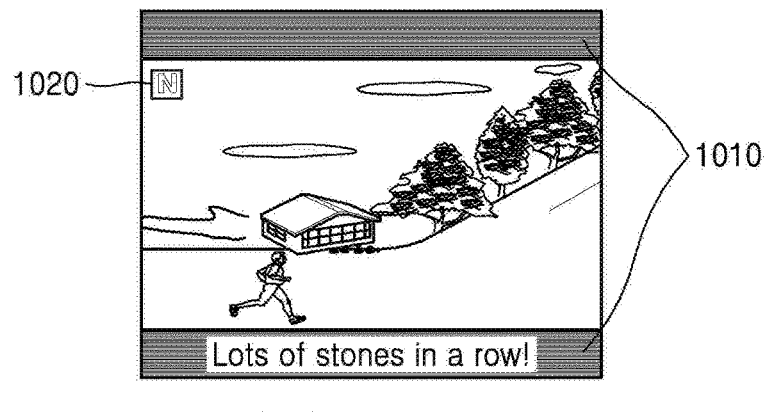
FIGS. 10A, 10B, and 10C are diagrams illustrating a process of pre-processing a sequence to determine a descriptor, which is performed by the device, according to an exemplary embodiment.
Figure 10B:
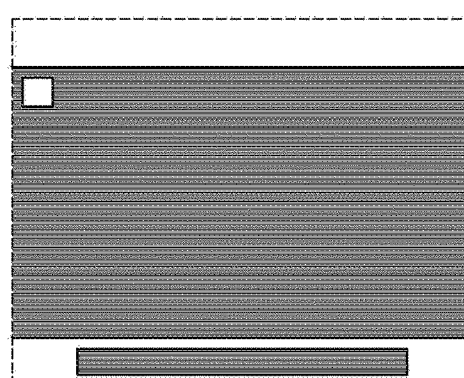
Figure 10C:
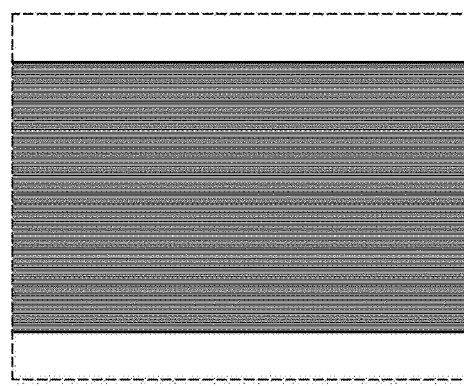

FIGS. 10A, 10B, and 10C are diagrams illustrating a process of pre-processing a sequence to determine a descriptor, which is performed by the device 100, according to an exemplary embodiment.

If the device 100 obtains a plurality of sequences from images different from each other, the device 100 may obtain a sequence of an image to which a border is added, according to a size of a frame. A border may be an upper or lower margin or a boundary margin of a frame for adjusting a size of the frame of an image. For example, a border may be a margin in black or another color. However, a border is not limited thereto, and may include an image.

If the device 100 determines a similarity between an original image and an image to which a border is added, the border may be very big noise. Accordingly, the device 100 may remove an area in which the border is located in the obtained sequence before determining a descriptor. Referring to FIG. 10A through 10C, according to an exemplary embodiment, a process of removing a border area in a first sequence, which is obtained from an image to which a border is added, is shown.

Referring to FIG. 10A, an original frame of a first frame in a first sequence is shown. The original frame of the first frame includes borders 1010 that include upper and lower black margins, and a mark 1020 located on an upper left part of the original frame. The device 100 may select pixels having a same pixel value in a same location in all frames including the first frame that are included in the first sequence. For example, the device 100 may select pixels included in the borders 1010 and pixels included in the mark 102. Referring to FIG. 10B, the first frame in which areas of the selected pixels are shown in white (i.e., from which an initial border is removed) is shown.

The device 100 may determine a border area by performing calibration to reduce an error in the selection of pixels. In detail, with respect to rows or columns in which the selected pixels are present, if a number of the selected pixels in a row or column is equal to or greater than a predetermined number, the device 100 may determine areas of all pixels in the row or column as border areas. If a number of the selected pixels in a row or column is less than a predetermined number, the device 100 may determine areas of all pixels in the row or column as non-border areas. Referring to FIG. 10C, the first frame in which the determined border areas are shown in white (i.e., from which a calibrated border is removed) is shown.

The device 100 may determine border areas in all frames in the obtained first sequence as being located in same positions in the frames.

Additionally, the device 100 may determine a descriptor by using areas other than the determined border areas of the frames in the first sequence.

In detail, the device 100 may determine a descriptor of the first frame based on luma information about blocks included in area other than the determined border areas of the first frame in the first sequence.

The device 100 may determine border areas in a second sequence by using the same method, and determine a descriptor of a second frame based on luma information about blocks included in areas other than the determined border areas of the second frame in the second sequence.

Figure 11:
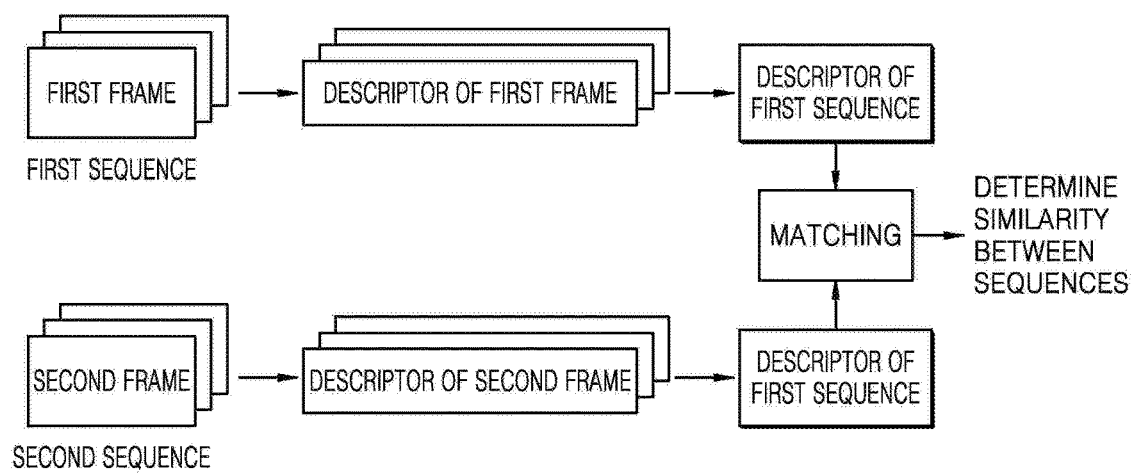
FIG. 11 is a diagram illustrating a process of determining a similarity between sequences, which is performed by the device, according to another exemplary embodiment.

FIG. 11 is a diagram illustrating a process of determining a similarity between sequences, which is performed by the device 100, according to another exemplary embodiment.

According to another exemplary embodiment, the device 100 may determine a similarity between sequences with respect to a plurality of sequences.

The device 100 may determine descriptors of sequences different from each other, to determine whether the sequences are similar to each other. A sequence is a part or whole of a sequence, and sequences different from each other may be obtained from an image or images different from each other. Additionally, the sequences different from each other may overlap with each other in an image.

The device 100 may determine a descriptor of a frame that represents color information of the frame with respect to frames included in the obtained sequence, and determine a descriptor of the sequence by using the determined descriptor of the frame.

For example, the device 100 may determine a descriptor of the first sequence based on a descriptor of a first frame, and determine a descriptor of the second sequence based on a descriptor of a second frame. The device may compare the determined descriptor of the first sequence to the determined descriptor of the second sequence, and thus, determine whether the first sequence is similar to the second sequence.

The device 100 may determine the descriptor of the first frame and the descriptor of the second frame, by using the same method described with reference to FIGS. 4A through 4D. For example, the device 100 may determine the descriptor of the first sequence, based on the descriptor of the first frame that is expressed in a binary code and is information showing a degree of a change in a luma value according to a location in the first frame.

In detail, the device 100 may convert the descriptor of the first frame by using a plurality of predetermined codes. For example, the device 100 may select a predetermined code that is most similar to the descriptor of the first frame by comparing the descriptor of the first frame to the plurality of codes, and convert the descriptor into an index number of the selected code. The device 100 may determine a descriptor of the first sequence, based on descriptors of frames in the first sequence including the converted descriptor of the first frame.

Additionally, the device 100 may convert descriptors of all frames included in the second sequence, and determine a descriptor of the second sequence based on the converted descriptors of the frames.

The device 100 may compare the determined descriptor of the first sequence to the determined descriptor of the second sequence, and determine whether the first sequence is similar to the second sequence based on the comparing.

FIGS. 12A, 12B, 13A, and 13B are diagrams illustrating a process of determining a descriptor of a sequence, which is performed by the device 100, according to another exemplary embodiment.

Figure 12A:
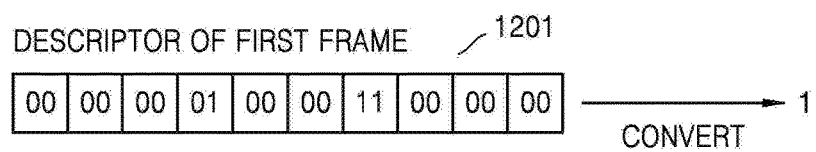
FIGS. 12A, 12B, 13A, and 13B are diagrams illustrating a process of determining a descriptor of a sequence, which is performed by the device, according to another exemplary embodiment.

FIG. 12A illustrates a process of converting a descriptor 1201 of a first frame in a first sequence, which is expressed in a 20-bit binary code, with reference to a predetermined code. The device 100 may convert the descriptor 1201 of the first frame with reference to a plurality of codes shown in FIG. 12B. The device 100 may store a plurality of codes that are predetermined by using many training frames.

The device 100 may compare the descriptor 1201 of the first frame to the plurality of codes, select a predetermined code that is most similar to the descriptor 1201 of the first frame, and convert the descriptor 1201 of the first frame into an index number of the selected code.

Figure 12B:
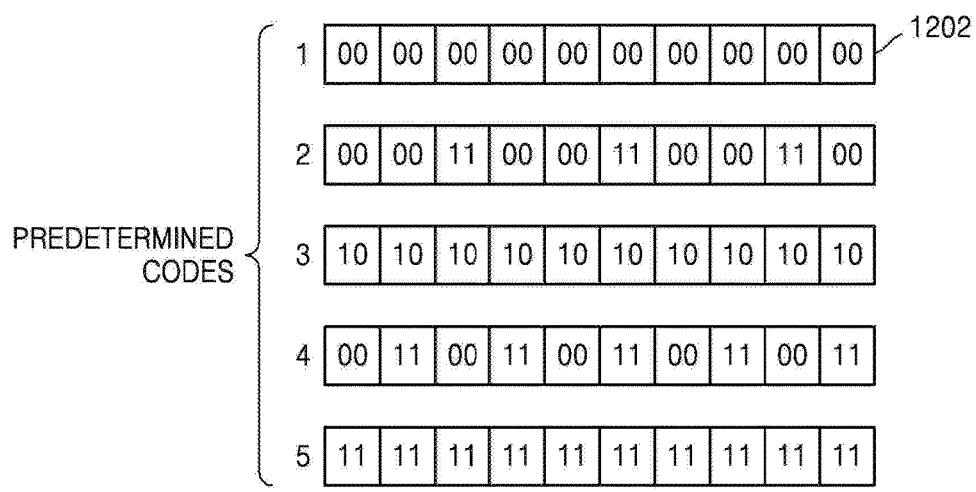

For example, the device 100 may calculate a Hamming distance between the descriptor 1201 of the first frame and the plurality of codes, and thus, select a code having a shortest Hamming distance from the descriptor 1201 of the first frame. Referring to FIGS. 12A and 12B, the device 100 may select a first code 1202 having a Hamming distance of 3 from the descriptor 1201 of the first frame. The device 100 may convert the descriptor 1201 of the first frame into an index number "1" of the selected first code 1202.

Figure 13A:
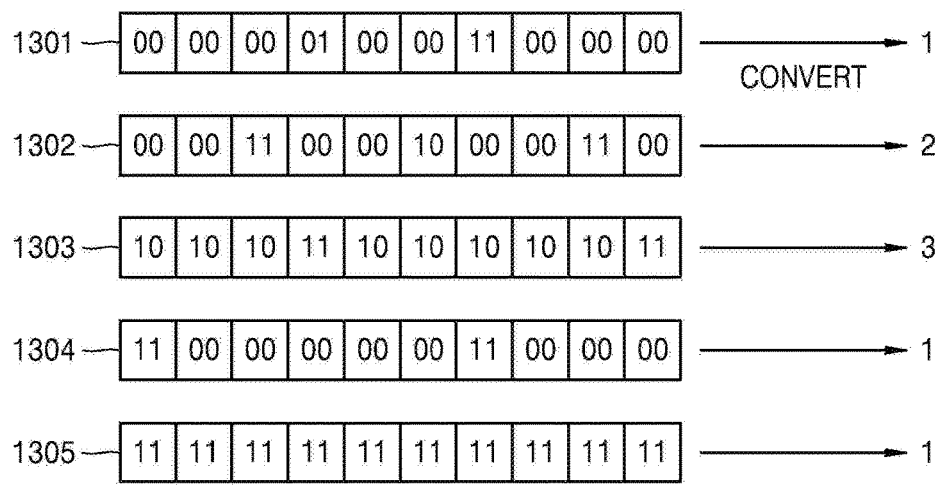

FIG. 13A illustrates a process of converting descriptors of a plurality of frames included in a first sequence. The first sequence may include five frames. FIG. 13A shows five descriptors 1301 through 1305 with respect to the five frames.

The device 100 may convert a descriptor of each frame into an index number of a code that is most similar to the descriptor, with reference to a plurality of codes. For example, the descriptors 1301, 1304, and 1305 may be converted into an index number "1" of a first code, the descriptor 1302 may be converted into an index number "2" of a second code, and the descriptor 1303 may be converted into an index number "3" of a third code.

Figure 13B:
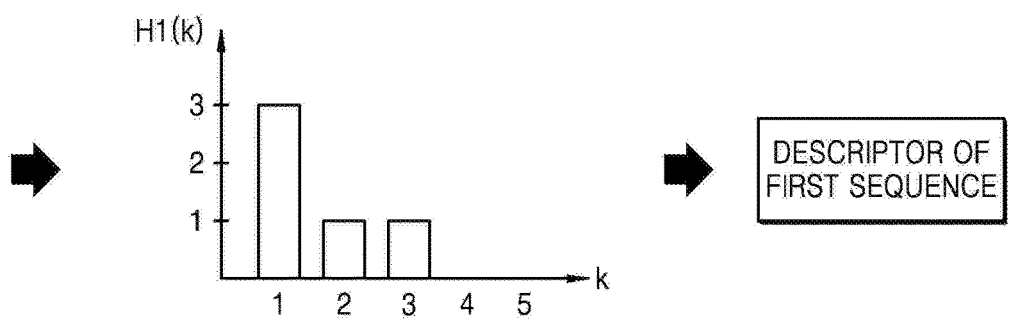

The device 100 may determine a descriptor of the first sequence based on descriptors of the converted frames. Referring to FIG. 13B, the device 100 may generate a histogram of descriptors by using the descriptors of the converted frames.

The generating of the histogram of the descriptors includes generating of a histogram by arranging the descriptors of the converted frames according to values. In detail, a horizontal axis k of the histogram may consist of the index numbers that are the descriptors of the converted frames. A vertical axis H1(k) may consist of a number of descriptors of the converted frame in the first sequence that respectively have an index number.

For example, the device 100 may generate a histogram shown in FIG. 13B, by using five converted descriptors 1 through 5 of the frames in the first sequence. The device 100 may determine the histogram, shown in FIG. 13B, as the descriptor of the first sequence.

The device 100 may determine a descriptor of a second sequence by using the same method.

The device 100 may determine whether the first sequence is similar to the second sequence, by comparing the descriptor of the first sequence to the descriptor of the second sequence. For example, if a Bhattacharyya distance between the descriptor of the first sequence and the descriptor of the second sequence is less than a predetermined value, the device 100 may determine that the first sequence is similar to the second sequence. A Bhattacharyya distance is a distance for measuring a similarity between two discrete or continuous probability distributions, which, in this case, is calculated to determine a similarity between histograms by using Equation 3 shown below.

$$d(Hn, Hm) = \sqrt{1 - \frac{1}{\overline{Hn}\,\overline{Hm}} \Sigma_k \sqrt{Hn(k)Hm(k)}}\,,$$ [Equation 3]

$$\overline{Hn} = \frac{1}{N} \Sigma_k Hn(k)$$

In Equation 3, d(Hn,Hm) represents a Bhattacharyya distance between a descriptor Hn of an nth sequence and a descriptor Hm of an mth sequence.

Figure 14A:
FIGS. 14A, 14B, and 14C are diagrams illustrating a process of determining a descriptor, which is performed by the device, according to another exemplary embodiment.
Figure 14B:
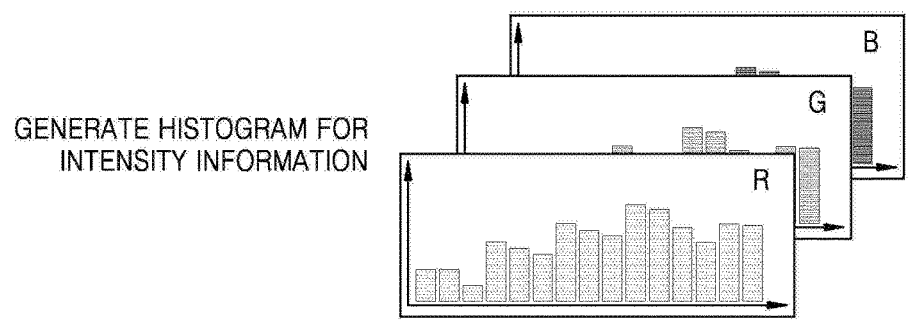
Figure 14C:
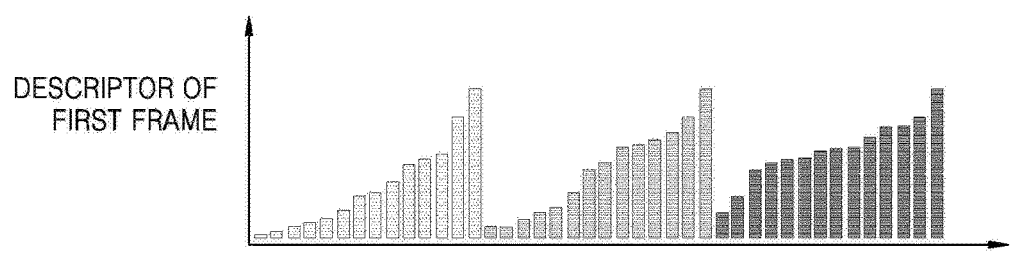

FIGS. 14A, 14B, and 14C are diagrams illustrating a process of determining a descriptor, which is performed by the device 100, according to another exemplary embodiment.

The device 100 may determine a descriptor of a frame by using color information, with respect to frames included in an obtained sequence. For example, a descriptor of a frame may be a histogram generated by using a distribution of intensity information about colors for each channel in a frame represented in a red, green, and blue color (RGB) space. If the descriptor of the frame is determined by using intensity information about colors in the RGB color space, the device 100 may determine a descriptor that is robust to a change such as cropping, rotation, or symmetry movement of a sequence.

Referring to FIG. 14A, the device 100 may divide a first frame in a first sequence into a channel R, a channel G, and a channel B in an RGB color space. The device 100 may generate a histogram with respect to a pixel value of pixels (i.e., intensity information) included in a frame for each channel, and thus, generate a histogram for the channel R, a histogram for the channel G, and a histogram for the channel B. FIG. 14B illustrates a histogram for each channel. Referring to FIG. 14B, histograms for respective channels are shown.

FIG. 14C shows a descriptor of the first frame. The device 100 may combine the generated histograms for the respective channels with each other, and normalize the histograms. The device 100 may determine a histogram, shown in FIG. 14C, as the descriptor of the first frame.

The device 100 may convert the descriptor of the first frame into an index number of a predetermined histogram, with reference to a plurality of histograms instead of a plurality of codes. The device 100 may determine the descriptor of the first sequence based on the converted descriptor of the first frame and descriptors of frames included in the first sequence.

Figure 15A:
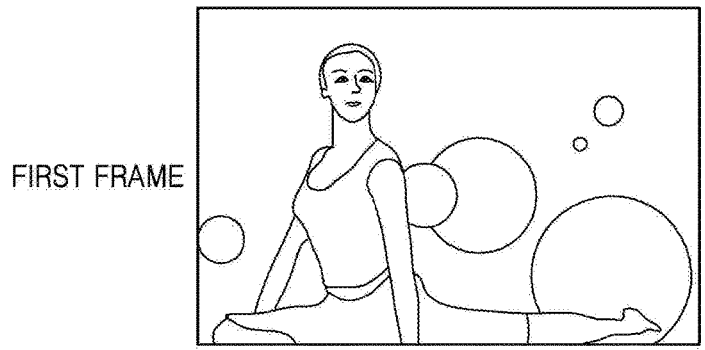
FIGS. 15A, 15B, and 15C are diagrams illustrating a process of determining a descriptor, which is performed by the device, according to another exemplary embodiment.
Figure 15B:
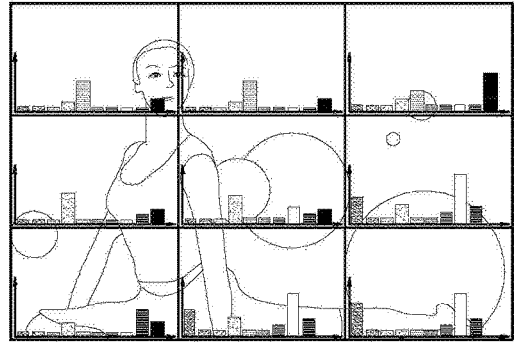
Figure 15C:

FIGS. 15A, 15B, and 15C are diagrams illustrating a process of determining a descriptor, which is performed by the device 100, according to another exemplary embodiment.

The device 100 may determine a descriptor of a frame by using color information, with respect to frames included in an obtained sequence. For example, a descriptor of a frame may be histogram information generated by using a distribution of hue information in the frame expressed in a hue, saturation, and value (HSV) color space. If a descriptor of a frame is determined by using hue information about the HSV color space, the device 100 may determine a descriptor that is robust to a chrome change and an intensity change in a whole sequence.

Referring to FIG. 15A, the device 100 may convert a first frame represented in an RGB color space into a frame represented in a HSV color space. The device 100 may generate a histogram by using hue information about pixels included in the converted first frame for a channel H. The device 100 may generate a histogram by quantizing hue information about each pixel into predetermined representative colors.

Additionally, referring to FIG. 15B, the device 100 may divide a first frame into a plurality of blocks, generate histograms by using the quantized color information about pixels included in respective blocks, and then, generate a histogram for the first frame by combining the histograms for the respective blocks with each other.

FIG. 15C illustrates the histogram obtained by combining the histograms with each other for the first frame. The device 100 may determine the histogram, shown in FIG. 15C, as a descriptor of the first frame.

The device 100 may convert the descriptor of the first frame into an index number of a predetermined histogram, with reference to a plurality of histograms instead of a plurality of codes. The device 100 may determine a descriptor of the first sequence based on the converted descriptor of the first frame and descriptors of frames included in the first sequence.

The device 100 may determine three descriptors of a frame, by using a method using luma information about a frame, a method using intensity information about an RGB color space, and a method using hue information about a HSV color space. The device 100 may determine a plurality of descriptors of a sequence, based on the three descriptors of the frame that are determined by using the three methods different from each other.

For example, the device 100 may determine a first descriptor of the first sequence based on the method using luma information, determine a second descriptor of the first sequence based on the method using a pixel value for each channel in an RGB color space, and determine a third descriptor by using a method using hue information about a HSV color space. Then, the device 100 may accurately determine a similarity between sequences by comparing descriptors of other sequences to the first descriptor, the second descriptor, and the third descriptors at a same time.

If a distance between any of the first through third descriptors of the first sequence and descriptors of the second sequence is less than a predetermined value, the device 100 may determine that the first sequence is similar to the second sequence.

The device 100 may provide a similarity determination method robust to a variation of a sequence, by using descriptors determined by using the methods different from each other.

Figure 16:
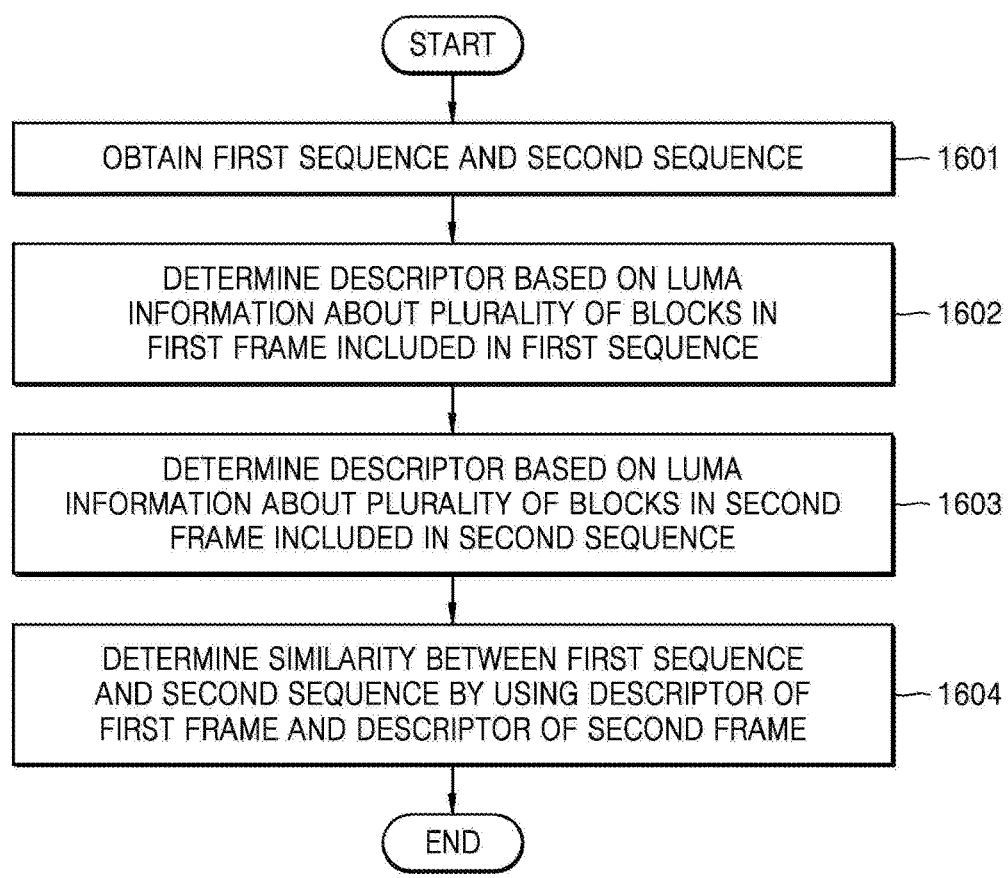
FIG. 16 is a flowchart of a method of determining a similarity between sequences, which is performed by the device, according to an exemplary embodiment.

FIG. 16 is a flowchart of a method of determining a similarity between sequences, which is performed by the device 100, according to an exemplary embodiment.

Referring to FIG. 16, in operation 1610, the device 100 obtains a first sequence and a second sequence that each includes a plurality of frames. The device 100 may obtain a first sequence and a second sequence from an image or images different from each other that are stored in the device 100 or an external apparatus.

The device 100 may extract one or more frames included in the first sequence as one or more key frames in the first sequence according to a predetermined frame rate, and extract one or more frames included in the second sequence as one or more key frames in the second sequence according to the frame rate.

Additionally, the device 100 may determine a border area of the obtained sequence, and thus, perform pre-processing for removing the border area.

In operation 1602, the device 100 determines a descriptor of a first frame included in the first sequence based on luma information about a plurality of blocks in the first frame included in the first sequence. The first frame may be one of the key frames in the first sequence.

In detail, the device 100 may divide the first frame into a plurality of blocks that have a same size and include a plurality of pixels. The device 100 may determine luma information about respective blocks by using a luma value of pixels included in the respective blocks. For example, luma information about a block may be an average luma value of the block.

The device 100 may compare the determined luma information about the respective blocks to each other, and thus, determine information about a luma difference between the blocks. The information about the luma difference between blocks may be information obtained by numeralizing a value of a difference between average luma values of the respective blocks according to a reference section. For example, the information about the luma difference may be determined as a 2-bit binary code according to a value of a difference between average luma values of two blocks. The device 100 may determine a descriptor of the first frame that is expressed in a 2-bit binary code based on information about a luma difference between the plurality of blocks.

In operation 1603, the device 100 determines a descriptor of a second frame included in the second sequence based on luma information about a plurality of blocks in the second frame included in the second sequence. The second frame may be one of key frames in the second sequence. The device 100 may determine a 2-bit binary code, which includes the luma information about the plurality of blocks in the second frame, as a descriptor of the second frame.

In operation 1604, the device 100 determines a similarity between the first sequence and the second sequence by using the descriptor of the first frame and the descriptor of the second frame.

In detail, the device 100 may match the first frame with the second frame by using the descriptor of the first frame and the descriptor of the second frame. The device 100 may determine frames having a shortest matching distance from each other as similar frames, and match the frames with each other. For example, the device 100 may calculate a Hamming distance between descriptors of frames, and thus, determine a matching distance between the frames.

The device 100 may calculate a Hamming distance between the descriptor of the first frame in the first sequence and descriptors of all frames in the second sequence and match a frame in the second sequence, which has a shortest Hamming distance from the descriptor of the first frame, with the first frame. For example, if a Hamming distance between the descriptor of the first frame and the descriptor of the second frame is shortest, the device 100 may match the first frame with the second frame.

The device 100 may determine a section in the second sequence, which is similar to, and thus, matches a section in the first sequence, based on a matching relation between the frames that is obtained by using the descriptors.

Additionally, the device 100 may represent a matching relation between frames, which is obtained by using descriptors, as a matching vector. The device 100 may determine a representative matching vector by using the matching vector, to speed up the determining of similarity. For example, the device 100 may determine a matching vector having a highest frequency, among matching vectors between sequences different from each other, as a representative matching vector.

The device 100 may determine matchings having a matching vector that is not similar to the representative matching vector, among matching, as noise by using the determined representative matching vector, and thus, remove the matchings. The device 100 may perform additional matching on frames whose matching was removed. In detail, the device 100 may perform the additional matching on frames whose matching was removed so that a matching vector of the additional matching is similar to the representative matching vector. For example, the similarity determiner 130 may match the frames with each other within a range according to the representative matching vector.

The device 100 may determine a section in the second sequence that matches a section in the first sequence as a section similar to the section in the first sequence, based on matching vectors of the additional matching.

Figure 17:
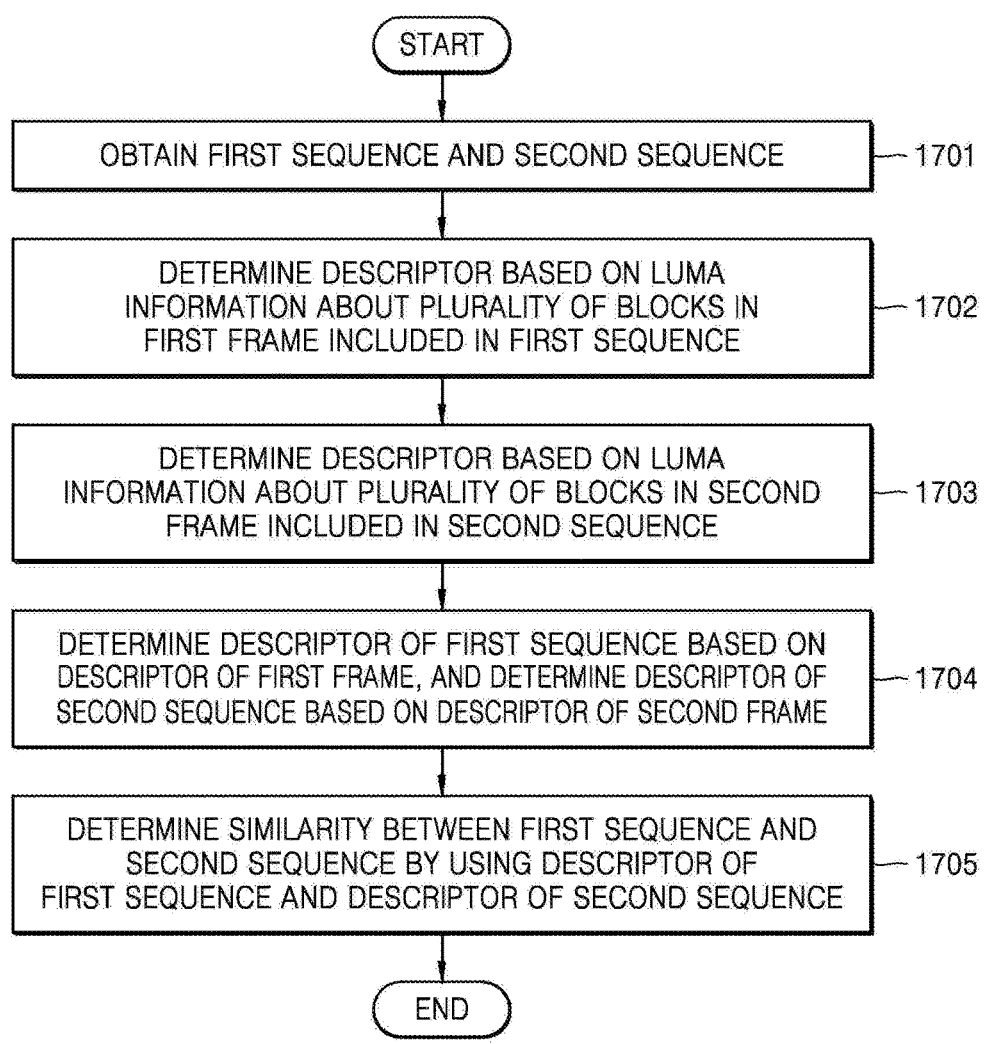
FIG. 17 is a flowchart of a method of determining a similarity between sequences, which is performed by the device, according to another exemplary embodiment.

FIG. 17 is a flowchart of a method of determining a similarity between sequences, which is performed by the device 100, according to another exemplary embodiment.

Referring to FIG. 17, in operation 1701, the device 100 obtains a first sequence and a second sequence.

In operations 1702 and 1703, the device 100 determines a descriptor of a first frame included in the first sequence based on luma information about a plurality of blocks in the first frame included in the first sequence, and determines a descriptor of a second frame included in the second sequence based on luma information about a plurality of blocks in the second frame included in the second sequence.

Additionally, the device 100 may determine a descriptor of the first frame by using a pixel value for each channel with respect to the first frame in the first sequence represented in an RGB color space.

The device 100 may divide the first frame in the first sequence into the channel R, the channel G, and the channel B in the RGB color space. The device 100 may generate a histogram by using pixel values of pixels included in the first frame for each channel, and thus, generate a histogram for the channel R, a histogram for the channel G, and a histogram for the channel B. The device 100 may combine the generated histograms for respective channels with each other, and normalize the histograms, and thus, determine the descriptor of the first frame.

The device 100 may determine a descriptor of the second frame included in the second sequence, by using pixel values for each channel in the RGB color space in the same method.

Additionally, the device 100 may determine a descriptor of the first frame by using color information in a channel H in the HSV color space with respect to the first frame in the first sequence.

The device 100 may generate a histogram by quantizing the hue information in the channel H in the HSV color space as a predetermined number of a representative color, and thus, determine the descriptor of the first frame. Alternately, the device 100 may divide the first frame into a plurality of blocks, and thus, generate histograms for hue information about pixels included in each block. Then, the device 100 may determine a histogram for the first frame by combining the generated histograms for the respective blocks with each other.

The device 100 may determine a descriptor of the second frame in the second sequence by employing the same method using color information in the channel H in the HSV color space.

In operation 1704, the device 100 determines a descriptor of the first sequence based on the descriptor of the first frame, and determines a descriptor of the second sequence based on the descriptor of the second frame.

If the descriptor of the first frame is a binary code, the device 100 may convert the descriptor of the first frame with reference to a plurality of predetermined codes. The device 100 may select a predetermined code that is most similar to the descriptor of the first frame, from the plurality of codes, and convert the descriptor of the first frame into an index number of the selected code. The device 100 may convert the descriptor of the second frame by using the same method.

Additionally, if the descriptor of the first frame is a histogram, the device 100 may convert the descriptor of the first frame with reference to a plurality of predetermined histograms. The device 100 may select a predetermined histogram that is most similar to the descriptor of the first frame, from the plurality of histograms, and convert the descriptor of the first frame into an index number of the selected histogram. The device 100 may convert the descriptor of the second frame by using the same method.

The device 100 may determine the descriptor of the first sequence based on the converted descriptors of all frames in the first sequence including the first frame. The device 100 may generate a histogram by using the converted descriptor of all the frames, and determine the generated histogram as a descriptor of the first sequence. The device 100 may determine a descriptor of the second sequence based on converted descriptors of all frames in the second sequence including a second frame, by using the same method.

The device 100 may determine three descriptors of a frame, by using a method using luma information about the frame, a method using intensity information in an RGB color space, and a method using hue information about a HSV color space. The device 100 may determine a plurality of descriptors of a sequence, based on the three descriptors of the frame that are determined by using the three methods different from each other.

For example, the device 100 may determine a first descriptor of the first sequence based on the method using luma information, determine a second descriptor of the first sequence based on the method using a pixel value for each channel in an RGB color space, and determine a third descriptor based on using a method using hue information about a HSV color space.

In operation 1705, the device 100 determines a similarity between the first sequence and the second sequence by using the descriptor of the first sequence and the descriptor of the second sequence. For example, the device 100 may determine whether the first sequence is similar to the second sequence, by comparing the descriptor of the first sequence to the descriptor of the second sequence.

For example, if a Bhattacharyya distance between the descriptor of the first sequence and the descriptor of the second sequence is less than a predetermined value, the device 100 may determine that the first sequence is similar to the second sequence.

Additionally, if a plurality of descriptors is determined with respect to the first sequence and the second sequence by using methods different from each other, the device 100 may determine whether the first sequence is similar to the second sequence by using the plurality of descriptors. For example, if a first descriptor, a second descriptor, and a third descriptors of the first sequence are determined, the device 100 may compare the first through third descriptors of the first sequence respectively to descriptors of the second sequence that are determined by using the same method.

The device 100 may determine a similarity between the first sequence and the second sequence by combining results obtained by comparing respective descriptors with each other that are obtained by using a plurality of methods. For example, if the device 100 determines that the descriptor of the first sequence and the descriptor of the second sequence obtained by using a method, among descriptors obtained by using the plurality of methods, are similar to each other, the device 100 may determine that the first sequence is similar to the second sequence.

The device 100 may provide a similarity determination method robust to a variation of a sequence, by using descriptors determined by using the methods different from each other.

According to one or more exemplary embodiments, the device for determining a similarity between sequences in an image may quickly and accurately determine a similarity between moving pictures, similar to each other, and provide information about a similarity between similar moving images, similar to each other, to a user.

It will be understood that the terms "comprises" and/or "comprising" used herein specify the presence of stated features or components, but do not preclude the presence or addition of one or more other features or components. In addition, the terms such as "unit," "-er (-or)," and "module" described in the specification refer to an element for performing at least one function or operation, and may be implemented in hardware, software, or the combination of hardware and software.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of determining similarity between sequences, the method comprising:
    obtaining a first sequence of frames and a second sequence of frames;
    determining a descriptor of a first frame of the first sequence based on luma information of blocks in the first frame, the descriptor of the first frame comprising luma difference information that is determined based on the luma information of the blocks in the first frame;
    determining a descriptor of a second frame of the second sequence based on luma information of blocks in the second frame, the descriptor of the second frame comprising luma difference information that is determined based on the luma information of the blocks in the second frame; and
    determining a similarity between the first sequence and the second sequence based on the descriptor of the first frame and the descriptor of the second frame,
    wherein the determining the descriptor of the first frame comprises:
        determining whether a number of at least one pixel having a same pixel value as a value of pixels at a same location in the frames of the first sequence among pixels in a row or a column of the first frame is greater than or equal to a predetermined number; and
        determining the descriptor based on the luma information of the blocks in a region of the first frame other than the row or the column of the first frame, in response to the determining that the number of the at least one pixel is greater than or equal to the predetermined number.

2. The method of claim 1, wherein the determining the similarity comprises:
    matching the first frame with the second frame based on the descriptor of the first frame and the descriptor of the second frame; and
    determining a section in the second sequence that matches a section in the first sequence as a section similar to the section in the first sequence, based on the matched first frame and second frame.

3. The method of claim 2, wherein the matching comprises:
    determining whether a Hamming distance between the descriptor of the first frame and the descriptor of the second frame is shortest; and
    matching the first frame with the second frame in response to the determining that the Hamming distance between the descriptor of the first frame and the descriptor of the second frame is shortest.

4. The method of claim 2, wherein the determining the section in the second sequence comprises:
    obtaining a matching vector representing a matching relation between the matched first frame and second frame;
    determining a representative matching vector based on the obtained matching vector; and
    determining the section in the second sequence that matches the section in the first sequence as the section similar to the section in the first sequence, based on the representative matching vector.

5. The method of claim 4, further comprising:
determining whether the matching vector of the first frame is not included in a range based on the representative matching vector; and
re-matching the first frame with a frame in the second sequence within the range based on the representative matching vector, in response to the determining that the matching vector of the first frame is not included in the range based on the representative matching vector.

6. The method of claim 1, further comprising:
extracting one or more first frames from the frames of the first sequence based on a frame rate, the first frame being one of the one or more first frames; and
extracting one or more second frames from the frames of the second sequence based on the frame rate, the second frame being one of the one or more second frames.

7. The method of claim 1, further comprising:
determining a descriptor of the first sequence based on the descriptor of the first frame; and
determining a descriptor of the second sequence based on the descriptor of the second frame,
wherein the determining the similarity comprises determining the similarity based on a comparison of the descriptor of the first sequence to the descriptor of the second sequence.

8. The method of claim 7, wherein the determining the descriptor of the first sequence comprises converting the descriptor of the first frame into the descriptor of the first sequence based on codes, and
the determining the descriptor of the second sequence comprises converting the descriptor of the second frame into the descriptor of the second sequence based on the codes.

9. A non-transitory computer-readable recording storage medium storing a program to cause a computer to perform the method of claim 1.

10. A device for determining similarity between sequences, the device comprising:
at least one processor configured to:
obtain a first sequence of frames and a second sequence of frames;
determine a descriptor of a first frame of the first sequence based on luma information of blocks in the first frame, the descriptor of the first frame comprising luma difference information that is determined based on the luma information of the blocks in the first frame;
determine a descriptor of a second frame of the second sequence based on luma information of blocks in the second frame, the descriptor of the second frame comprising luma difference information that is determined based on the luma information of the blocks in the second frame; and
determine a similarity between the first sequence and the second sequence based on the descriptor of the first frame and the descriptor of the second frame,
wherein the at least one processor is further configured to:
if a number of at least one pixel having a same pixel value as a value of pixels at a same location in the frames of the first sequence among pixels in a row or a column of the first frame is greater than or equal to a predetermined number, determine the descriptor based on the luma information of the blocks in a region of the first frame other than the row or the column of the first frame.

11. The device of claim 10, wherein the at least one processor is further configured to:
match the first frame with the second frame based on the descriptor of the first frame and the descriptor of the second frame; and
determine a section in the second sequence that matches a section in the first sequence as a section similar to the section in the first sequence, based on the matched first frame and second frame.

12. The device of claim 11, wherein the at least one processor is further configured to:
determine whether a Hamming distance between the descriptor of the first frame and the descriptor of the second frame is shortest; and
match the first frame with the second frame in response to the at least one processor determining that the Hamming distance between the descriptor of the first frame and the descriptor of the second frame is shortest.

13. The device of claim 11, wherein the at least one processor is further configured to:
obtain a matching vector representing a matching relation between the matched first frame and second frame;
determine a representative matching vector based on the obtained matching vector; and
determine the section in the second sequence that matches the section in the first sequence as the section similar to the section in the first sequence, based on the representative matching vector.

14. The device of claim 13, wherein the at least one processor is further configured to:
determine whether the matching vector of the first frame is not included in a range based on the representative matching vector; and
re-match the first frame with a frame in the second sequence within the range based on the representative matching vector, in response to the at least one processor determining that the matching vector of the first frame is not included in the range based on the representative matching vector.

15. The device of claim 10, wherein the at least one processor is further configured to:
extract one or more first frames from the frames of the first sequence based on a frame rate the first frame being one of the one or more first frames; and
extract one or more second frames from the frames of the second sequence based on the frame rate, the second frame being one of the one or more second frames.

16. The device of claim 10, wherein the at least one processor is further configured to:
determine a descriptor of the first sequence based on the descriptor of the first frame;
determine a descriptor of the second sequence based on the descriptor of the second frame; and
determine the similarity based on a comparison of the descriptor of the first sequence to the descriptor of the second sequence.

17. The device of claim 16, wherein the at least one processor is further configured to:
convert the descriptor of the first frame into the descriptor of the first sequence based on codes; and
convert the descriptor of the second frame into the descriptor of the second sequence based on the codes.

18. The device of claim 17, wherein the at least one processor is further configured to:
convert the descriptor of the first frame into an index number of a code that is most similar to the descriptor of the first frame, among the codes; and generate a histogram of index numbers based on the index number as the descriptor of the first sequence.

* * * * *